United States Patent [19]

Nakagawa et al.

[11] 4,234,898
[45] Nov. 18, 1980

[54] DIGITAL MAGNETIC RECORDING AND REPRODUCING APPARATUS

[75] Inventors: Shozo Nakagawa; Katsuya Yokoyama, both of Machida; Hironobu Katayama, Sagamihara, all of Japan

[73] Assignee: Nippon Hōsō Kyōkai, Tokyo, Japan

[21] Appl. No.: 19,592

[22] Filed: Mar. 12, 1979

[30] Foreign Application Priority Data

Mar. 15, 1978 [JP] Japan .................................. 53/28757
Mar. 16, 1978 [JP] Japan .................................. 53/29221
Aug. 1, 1978 [JP] Japan .................................. 53/93092

[51] Int. Cl.³ .............................................. G11B 5/09
[52] U.S. Cl. ........................................ 360/41; 360/40
[58] Field of Search ........................ 360/39, 40, 41, 51

[56] References Cited

U.S. PATENT DOCUMENTS 4,017,903 4/1977 Chu .................................... 360/40
4,027,335 5/1977 Miller .................................. 360/40

Primary Examiner—Vincent P. Canney
Attorney, Agent, or Firm—Stevens, Davis, Miller & Mosher

[57] ABSTRACT

In a digital magnetic recording and reproducing apparatus, a digital code signal to be recorded is given a code conversion by means of modulo-2-adding another digital signal thereto to prevent a continuation of the same binary signal levels for a prolonged period. The signal level of the reproduced digital code signal is corrected by level comparison with a threshold level provided by applying the above reproduced digital code signal to a compensator and peak rectifiers, which have the same time-constant, and then the reproduced digital code signal is given another code conversion by means of modulo-2-adding still another digital signal provided for restoring the code conversion, so that it is possible to reproduce the original digital code signal faithfully.

9 Claims, 21 Drawing Figures

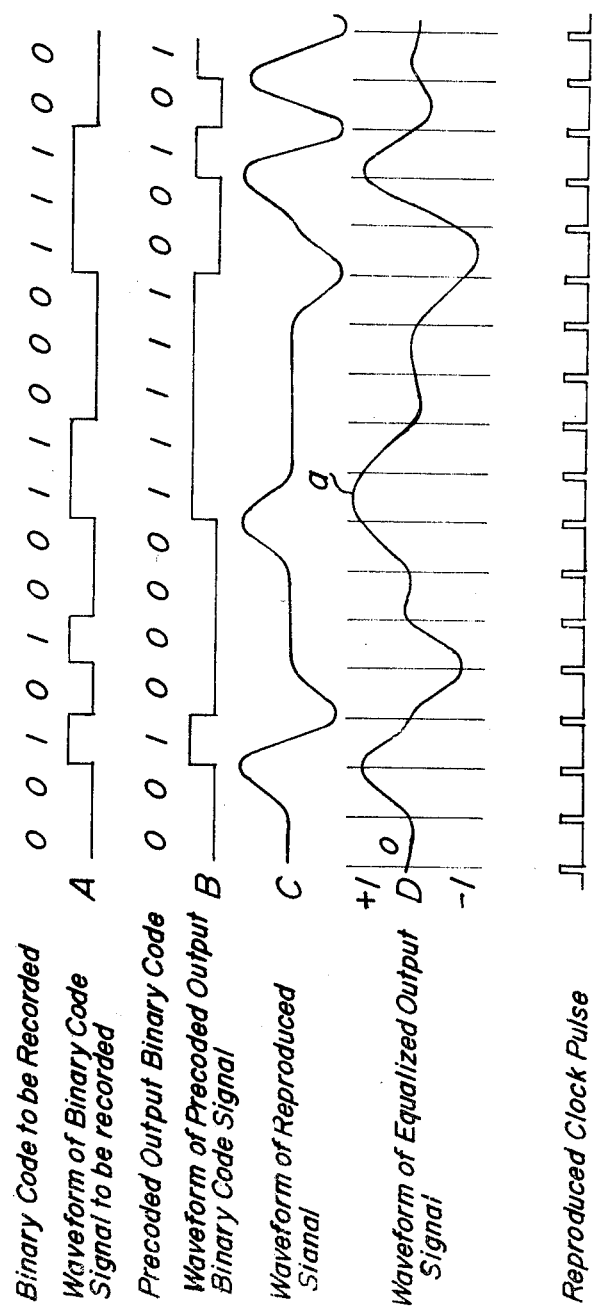

Equalizer Output A

Integrator Output B

Average Level Detection C, E, D

Comparator Output F

Digital Data Output G

Clock Input H

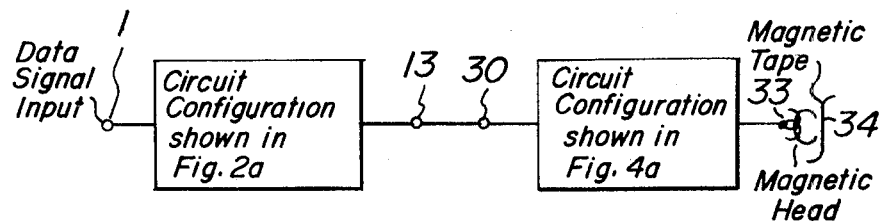
FIG_13a
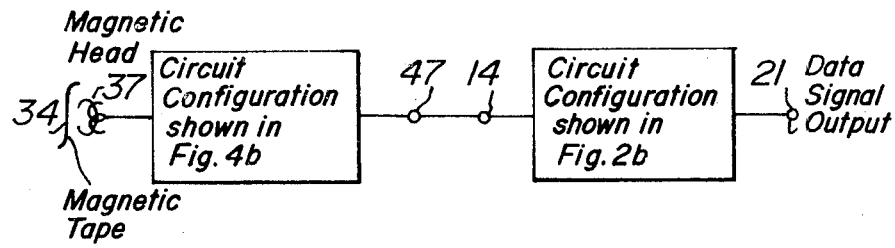
FIG_13b
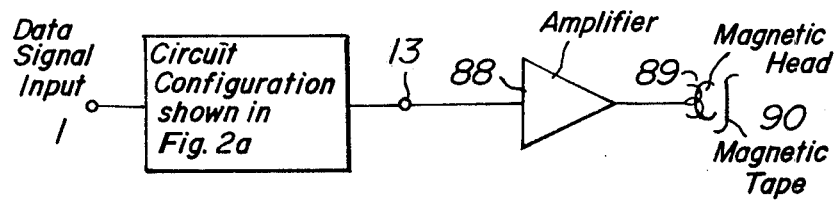
FIG_14a
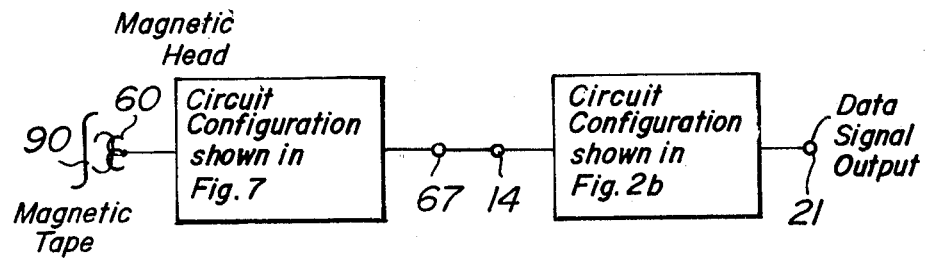
FIG_14b

DIGITAL MAGNETIC RECORDING AND REPRODUCING APPARATUS

BACKGROUND OF THE INVENTION (1) Field of the Invention:

The present invention relates to a digital magnetic recording and reproducing apparatus which records and reproduces a digital code signal, particularly to a digital magnetic recording and reproducing apparatus provided for recording a digital code signal which is previously encoded with a first code conversion and for restoring the original digital code signal by decoding the recorded signal using a second code conversion which is complementary to the first.

(2) Description of the Prior Art:

Recently, in accordance with the rapid progress of digital techniques, various types of the digital magnetic recording and reproducing apparatus provided for storing various kinds of coded information signals including, for example, coded picture signals have been investigated. Particularly, for the purpose of preventing the occurrence of erroneous codes caused by the inevitable deterioration of frequency response and signal-to-noise ratio of coded signals reproduced in those known apparatus, various kinds of improving methods have been investigated. Typically these improving methods employ the use of conventional methods applied in ordinary digital transmission systems in the magnetic recording and reproducing of digital signals. For example, the so-called non-return-to-zero-inverse system wherein a pseudo-random pulse sequence is modulo-2-added to the digital signals to be transmitted, the so-called partial response system wherein the code of digital signals to be transmitted is converted partially by utilizing the deformation of waveform which is caused by the performance of the transmission system, and the dc level restoration technique which is effected by the level comparison between the received digital signals and the threshold level generated by detecting peak levels thereof have been used.

However, those conventional improving methods, which present remarkable effects for the ordinary transmission systems, cannot present sufficient effects for recording and reproducing magnetically digital signals because of the problems which are peculiar to the magnetic recording and reproducing apparatus.

The above-mentioned problems are as follows.

(1) In magnetic recording and reproducing of digital code signals, when those digital code signals to be recorded and reproduced contain the portions in which almost the same signal level continues at a comparatively long interval, it is impossible to reproduce the clock pulse sequence continuously which is required for correcting signal levels and decoding of reproduced digital code signals and which is extracted from the reproduced digital signals by means of detecting polarity inversions, so that it is impossible also to properly restore the recorded digital code signal. Accordingly, a code conversion is desired which prevents the continuation of the same signal level in the digital code signal to be recorded.

However, the deformation of the reproduced digital code signal, which is caused by the response of magnetic heads, is so excessive that the above problem is not prevented by the above-mentioned known improving methods.

(2) The higher the density of the magnetic recording, the more excessive the variation in reproduced signal levels. Consequently, even if the aforesaid partial response system is adopted for magnetic recording and reproducing of the digital code signal, the correct discrimination of levels of the reproduced digital signal is disturbed by such excessive variations.

(3) As is true of most magnetic recording and reproducing apparatus, rapid variations in the reproduced signals caused by partial variations in the response of the magnetic carriers, for example, magnetic tapes, cannot be avoided. Therefore, in order for the level comparison to correct the reproduced signal level the threshold level used for the level comparison must follow the above rapid variations in the response faithfully. However, sufficient faithfulness cannot be obtained by the above-mentioned conventional dc level restoration effected by the known simple peak detection.

(4) The deterioration of response in the lower frequency range, which is caused by rotary transformers and magnetic heads, is inevitable in the magnetic recording and reproducing apparatus. Accordingly, when the digital code signals to be recorded and reproduced contain portions in which almost the same signal level continues for a comparatively long interval, as mentioned above, excessive shifts of levels of the reproduced signal are caused by the aforesaid deterioration of response in the far lower frequency range, and, as a result thereof, the erroneous codes frequently occur.

Thus, as explained above, the digital magnetic recording and reproducing apparatus has many difficult problems which are peculiar thereto which do not occur in the ordinary digital transmission systems.

SUMMARY OF THE INVENTION

An object of the present invention is to realize an improved digital magnetic recording and reproducing apparatus provided for recording and reproducing coded information signals, wherein the occurrence of erroneous codes can be minimized. This is accomplished by improving various conventional methods for preventing the occurrence of erroneous codes from the ordinary digital transmission systems in order to make them suitable for solving problems which are peculiar to the magnetic recording and reproducing apparatus.

Another object of the present invention is to provide a digital magnetic recording and reproducing apparatus wherein the occurrence of erroneous codes is prevented by reducing the probability of the continuation of the same signal level at a comparatively long interval of the digital code signal to be recorded, without lowering transmission efficiency, by using an improved code conversion.

Still another object of the present invention is to provide a digital magnetic recording and reproducing apparatus wherein the partial response system is improved in order to make it suitable for magnetic recording and reproducing of a digital code signal.

Further still another object of the present invention is to provide a digital magnetic recording and reproducing apparatus wherein it is possible to record and reproduce the digital code signal faithfully by virtue of correct level comparison effected by applying the suitable threshold levels which are improved in order to make them suitable to handle rapid variations in the levels of the reproduced signal.

In one aspect the present invention realizes a digital magnetic recording and reproducing apparatus wherein the digital code signal is given an improved code conversion by means of modulo-2-adding another digital signal provided for preventing the continuation of same signal levels, the injurious effect of which is increased by the differentiation of signal waveform and the variations in signal level and frequency response which occur in a reproduced digital code signal. The levels of the reproduced signal are corrected by the level comparison with improved threshold levels which are obtained by applying the above reproduced signal to a compensator and peak rectifiers, which treat the above reproduced signal with the same time-constant respectively, the above reproduced and corrected signal is then given another improved code conversion by means of modulo-2-adding still another digital signal provided for restoring the previously applied code conversion.

The present invention will be explained in detail with reference to some preferred embodiments shown in the following drawings.

BRIEF DESCRPTION OF THE DRAWINGS

FIG. 1 is a diagram showing an example of composition of a converted output digital code signal according to the present invention;

FIGS. 2(a) and (b) are block diagrams showing respectively a recording end and a reproducing end of a preferred embodiment of the so-called non-return-to-zero-inverse system improved according to the present invention;

FIG. 3 is a graph showing an example of improved performance of the embodiment shown in FIG. 2;

FIGS. 4(a), (b) and (c) are block diagrams showing respectively a recording end, a reproducing end and a detailed portion thereof of a preferred embodiment of the so-called partial response system improved according to the present invention;

FIG. 5 is a diagram showing signal waveforms obtained in various portions of the embodiment shown in FIG. 4;

Figure 7:
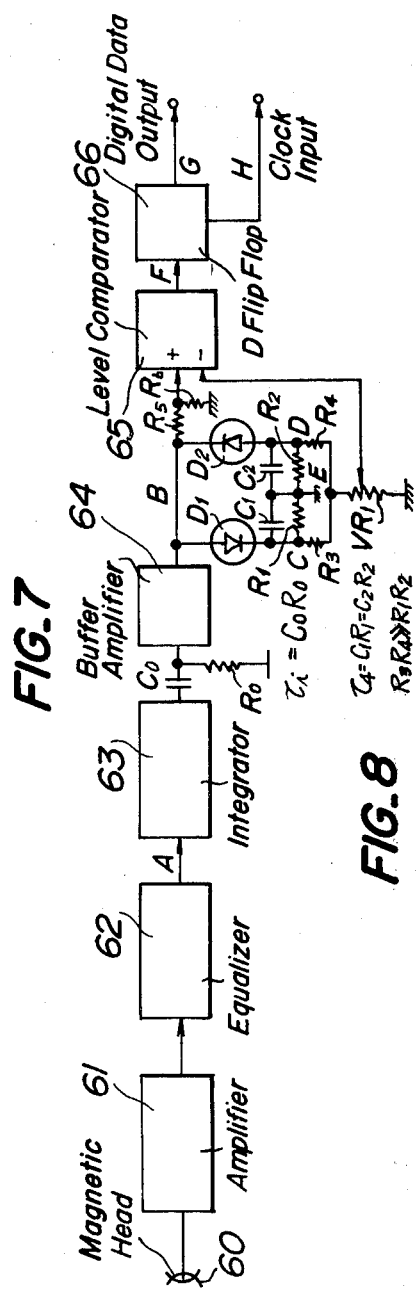
FIG. 7 is a block diagram showing a reproducing end of a preferred embodiment which performs an improved dc restoration according to the present invention.
Figure 8:
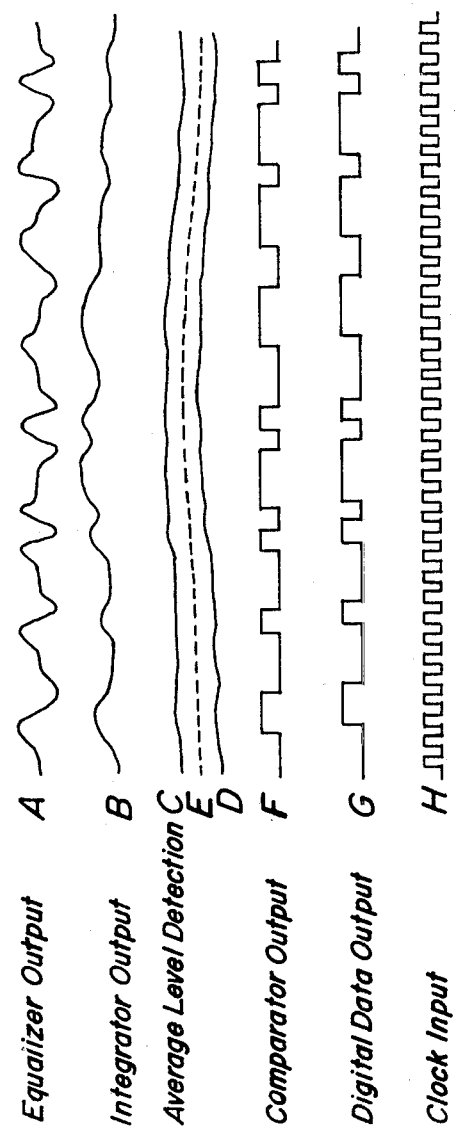
Figure 9:
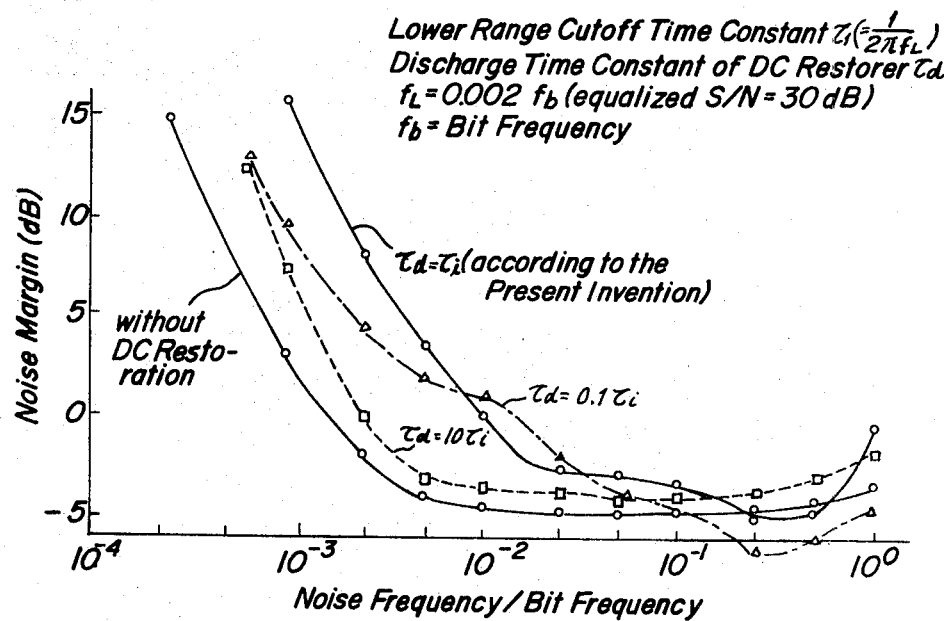
Figure 10:
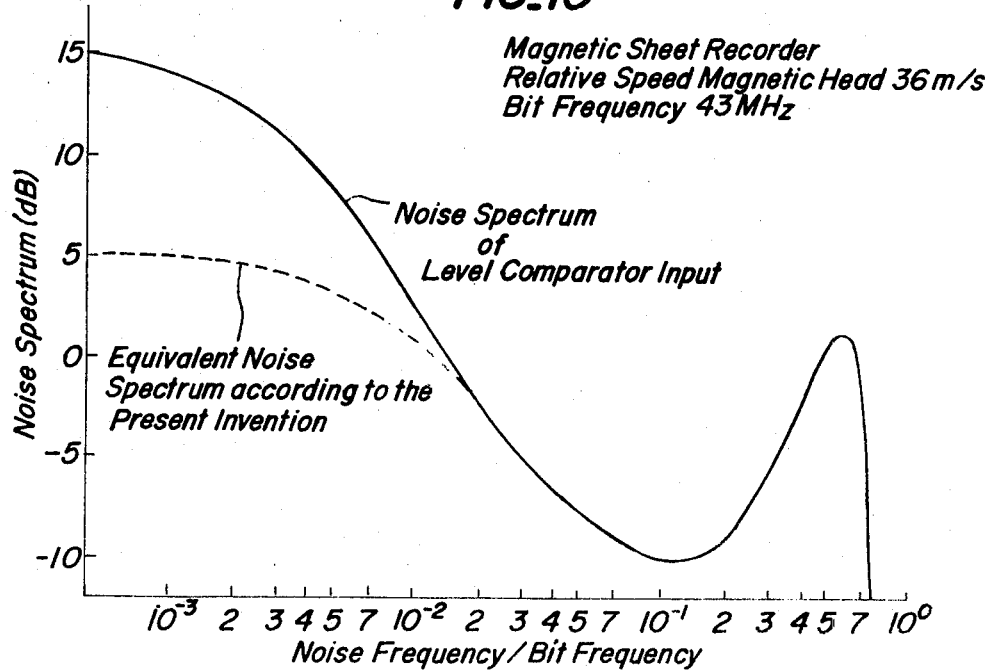
Figure 11A:
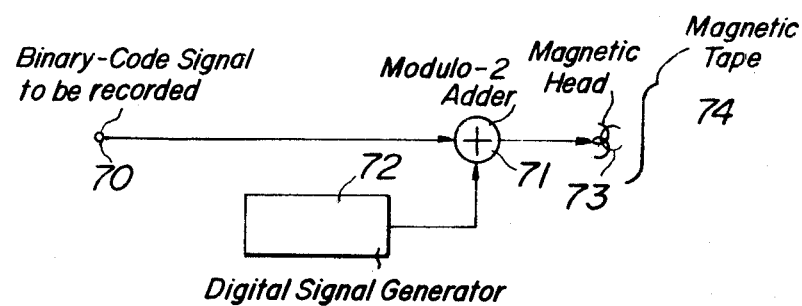
Figure 12A:
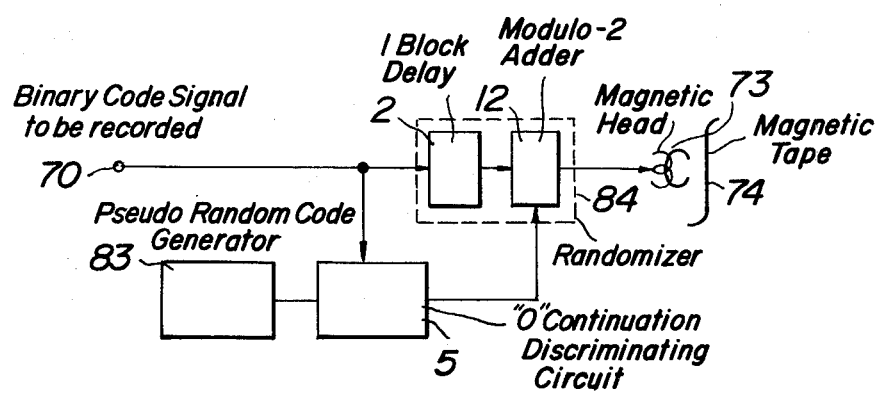

FIG. 8, including A-H, is a diagram showing signal waveforms obtained in various portions of the embodiment shown in FIG. 7;

FIG. 9 is a graph showing an example of the improved performance of the embodiment shown in FIG. 7;

FIG. 10 is a graph showing another example of the improved performance of the embodiment shown in FIG. 7;

FIGS. 11(a) and (b) are block diagrams showing respectively a recording end and a reproducing end of a generic embodiment of the present invention;

FIGS. 12(a) and (b) are block diagrams showing respectively a recording end and a reproducing end of another generic embodiment of the present invention;

FIGS. 13(a) and (b) are block diagrams showing respectively a recording end and a reproducing end of a combined embodiment of the present invention; and FIGS. 14(a) and (b) are block diagrams showing respectively a recording end and a reproducing end of another combined embodiment of the present invention.

DESCRIPTION OF THE PREFERRED EMBODIMENTS

The invention will first be explained with respect to an improvement in a digital magnetic recording and reproducing apparatus according to the so-called NRZI system, wherein an input coded signal is recorded magnetically after a code conversion effected by adding a pseudo randomly coded signal, so as to reduce the continuation of the same level in a recorded signal, and the above added pseudo randomly coded signal is removed from a reproduced signal, so as to restore the original input coded signal.

It is well known that the digital magnetic recording using the non-return-to-zero-inverse system, that is, the so-called NRZI system, is one of the most preferable methods available for recording various coded information signals, for instance, the digitized picture signal, particularly for recording with high density.

In this magnetic recording of the NRZI system, a recording current is not inverted in response to a "0" level of a binary code signal to be recorded, but is inverted in response to "1" level of the binary code, so that in response to "0" level, the recording current is maintained in the just immediate state. Accordingly, in the case of either one of a "1" and "0" level, the latter of which is practicable, continues at a comparatibly long interval of the binary code to be recorded. In a typical example, in the case of the digitized picture signal representing an image having comparatively large areas of the image information, the recording current is maintained in an unchanged state without inversion at the above interval.

On the other hand, a bit synchronizing signal required for decoding the coded information signal is not usually transmitted or recorded in company therewith, but is regenerated with the aid of timing informations extracted from the received or reproduced coded information signal. Accordingly, the bit synchronizing signal can not be regenerated in the above wherein the same digit continues in the binary code.

Moreover, a binary code signal to be transmitted or a waveform of a digital recording current, which contains several portions wherein either one of a "0" and "1" level continues at a comparatively long interval, has an extremely low frequency component. If the transmission system for transmitting the above binary code signal or the recorder for recording the above recording current has a frequency response of lower range cutoff, the above extremely low frequency component is lost in a received or reproduced signal. Sometimes, even if the transmission system or the recorder has a very low frequency response, a continuous "0" or "1" level cannot be maintained for a long time in the received or reproduced signal because of a lowered signal to noise ratio or a distorted waveform, so that erroneous codes are caused.

For the purpose of removing the occurrence of the above erroneous codes in the digital recording of the NRZI system owing to the continuation of the same level of the digital signal to be recorded, several improving methods have been investigated up to the present. One of those methods is the so-called four-to-five bit conversion system wherein every division of four bits consisting in the binary code signal is added with one bit respectively, so as to convert the above binary code signal into another binary code signal consisting of sequence of such divisions containing five bits individually, in which divisions the continuation of the same level does not exceed the length of two bits. Another of the improving methods is the so-called scrambled NRZI system wherein the binary code signal to be transmitted or recorded is randomized by modulo-2-adding a known pseudo random pattern pulse sequence derived from a maximum shiftregister sequence generator. The known pseudo random pattern pulse sequence is then removed from the received or reproduced binary code signal which has been randomized as mentioned above, so as to restore the original binary code signal.

However, the above-mentioned improving methods, which are used for lowering the probability of continuation of the same level at a comparatively long interval, have other kinds of defects respectively. For example, the aforesaid four-to-five bit system has the defect of lowered transmission efficiency, i.e., reduced by one fifth, caused by the addition of one bit to a group of four bits, and the aforesaid scrambled NRZI system has the other defect of insufficient reduction in the probability of the same signal level continuing for a comparatively long interval, which reduction can be performed by simply modulo-2-adding the pseudo-random pattern pulse sequence.

In contrast to these techniques, the problem of a continuous signal level can be removed as follows according to the present invention.

Figure 1:
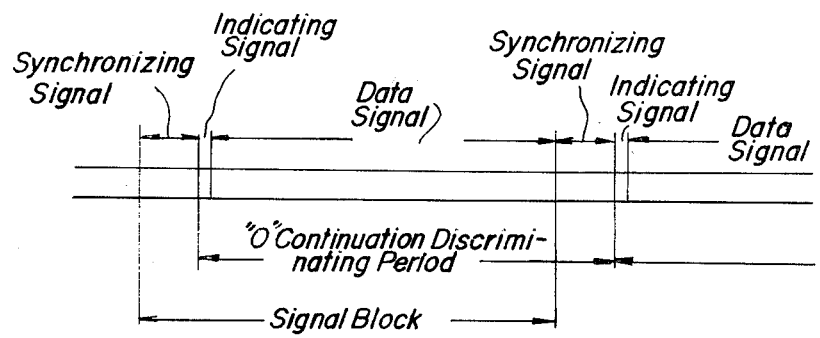

FIG. 1 shows an example of the configuration of an improved digital code signal to be recorded which is converted according to the present invention. In FIG. 1, a signal block indicates an interval of one block of the converted output digital code signal, for instance, a horizontal scanning interval of a digitized picture signal. The signal block is composed of a synchronizing signal which has a predetermined pattern provided for indicating the timing of the signal block, an indicating signal which indicates the kind of pattern of the pseudo randomly coded signal to be added to the input digital code signal and a data signal consisting of the data which is contained in the input digital code signal and is randomized by the aforesaid modulo-2-addition of the pseudo random coded signal converted after being derived from the maximum shiftregister sequence generator. It is preferable that the aforesaid pattern of the synchronizing signal is formed such that the beginning or the last bit is set at a "1" level.

Figure 2A:
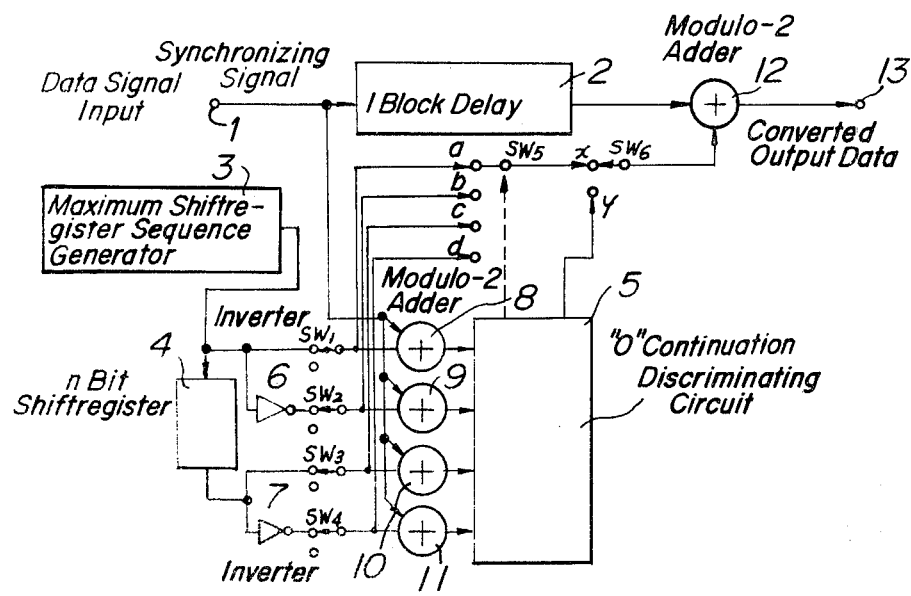

FIGS. 2(a) and (b) show respectively a recording end and a reproducing end of an embodiment of the digital magnetic recording and reproducing apparatus improved according to the present invention. In the recording end shown in FIG. 2(a), the data signal, and the synchronizing signal except for the indicating signal represented preferably by a sequence of "0" level bits which are shown in FIG. 1, are applied through an input terminal 1 to a one block delay 2 and four exclusively adding logic circuits, namely modulo-2 adders 8, 9, 10 and 11 in parallel. On the other hand, a maximum shiftregister sequence generator 3 generates a pulse sequence having a predetermined pseudo random pattern, which pattern is always invariable after once determined. The pseudo random pattern pulse sequence is delayed and/or inverted by a n bit shiftregister 4 and inverters 6 and 7 respectively, so as to convert the original pseudo random pattern pulse sequence into other pulse sequences which have respective random patterns differing from the original random pattern respectively. The shiftregister 4 and the inverters 6 and 7 are reset each time by the beginning of each block of the input digital code signal which is divided as shown in FIG. 1, and then forms those pulse sequences having the same pattern with each other repeatedly in synchronism with the synchronizing signal of the input digital code signal.

The above mentioned pseudo random pattern which is represented by the pulse sequence derived from the maximum shiftregister sequence generator 3 is formed in such a way that the same pattern is formed repeatedly in a loop at every one block of the input digital code signal by means of resetting the above generator 3 at the same interval. In the recording end shown in FIG. 2(a), a group of four kinds of pseudo randomly coded pulse sequences is formed of the above pseudo random pattern pulse sequence as follows.

The pseudo random pattern pulse sequence derived from the maximum shiftregister sequence generator 3 is applied directly through a switch $SW_1$ to an exclusively adding logic circuit 8, and is applied through another switch $SW_2$ to another exclusively adding logic circuit 9 after being inverted by an inverter 6, and is applied through still another switch $SW_3$ to still another exclusively adding logic circuit 10 after being shifted by n bits, for instance, 10 bits in an n-bit shiftregister 4, and further is applied through still another switch $SW_4$ to another exclusively adding logic circuit 11 after being shifted by the n-bit shiftregister 4 and inverted by another inverter 7. In those four exclusively adding logic circuits, namely modulo-2 adders 8, 9, 10 and 11, a group of four kinds of pseudo random pattern pulse sequences which have four kinds of pulse patterns being different from each other are modulo-2-added to the input digital code signal respectively, so as to form a group of four kinds of pseudo randomly coded pulse sequences. These four kinds of pseudo randomly coded pulse sequences have four kinds of random patterns individually, which random patterns are quite different from each other without any correlation between one another, so that it is possible to obtain four kinds of pseudo randomly coded pulse sequences by virtue of the above mentioned simple process of pattern conversion.

The "0" level continuation discriminating circuit 5, which is applied with the above-mentioned four kinds of pseudo randomly coded pulse sequences, discriminates the largest numbers of "0"s which continue at every one block of the input digital code signal shown in FIG. 1, with regard to those four kinds of pseudo randomly coded pulse sequences respectively, and then detects the smallest one of those largest numbers of continued "0"s. A selecting switch $SW_5$ selects that pseudo random pattern pulse sequence which was used in creating the pseudo random coded pulse sequence having the least number of continued "0"s under the control of the "0" continuation discriminating circuit 5. The above selected one of the four kinds of pseudo random pattern pulse sequence is modulo-2-added to the input digital code signal which is delayed by one block in a one-block delay 2 provided for obtaining the coincidence of timing between two signals to be added, that is, the input digital code signal and the above selected pseudo random pattern pulse sequence which is confirmed one block earlier to form a desired random coded signal having the smallest number of continued "0"s in every one block as mentioned above.

An added output signal derived from a modulo-2 adder 12, which is provided for effecting the above-mentioned modulo-2-addition, is inserted in every division thereof. An indicating signal provided for indicating the kind of pattern of the added pseudo random coded signal is also inserted, with the specified indicating signal corresponding to the above selected kind of pseudo random pattern pulse sequence, which signal is derived at the same time as the detection of the smallest maximum number from the "0" continuation discriminating circuit 5 through a changing switch $SW_6$. Switch $SW_6$ ensures that the above selected kind of pseudo random pattern pulse sequence is not added to the divisions of the input digital code signal where the synchronizing signal and the above indicating signal should be inserted.

By the way, the aforesaid pattern of the synchronizing signal, the last bit of which is "1" as mentioned earlier, present an effect of disturbing the continuation of "0" in the neighborhood thereof.

Figure 2B:
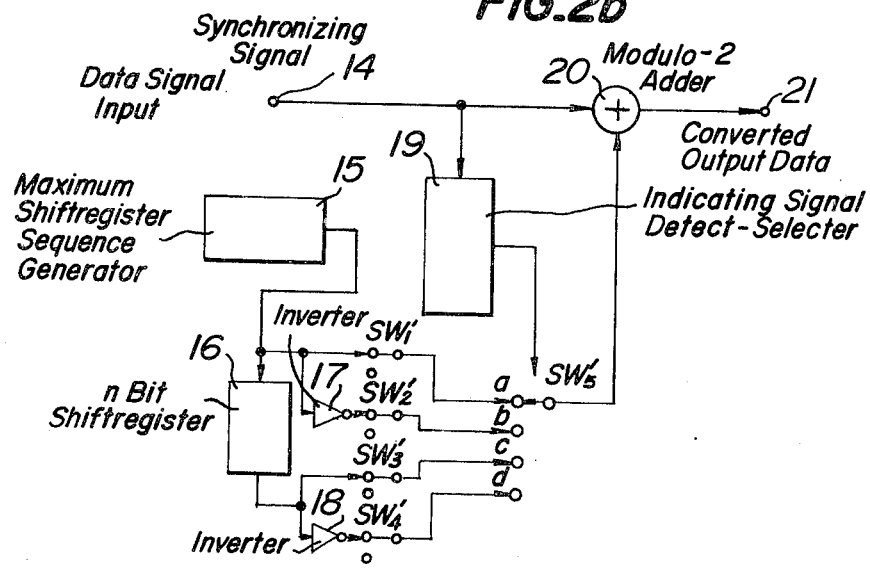

In the reproducing end shown in FIG. 2(b), the same group of four kinds of pseudo random pattern pulse sequences being quite different from each other as in the recording end shown in FIG. 2(a) is generated independently thereof by the combination of a maximum shiftregister sequence generator 15, an n-bit shiftregister 16, two inverters 17, 18 and four switches $SW_1'$, $SW_2'$, $SW_3'$, $SW_4'$ in the same manner as in the recording end. A selecting switch $SW_5'$ selects one of the above four kinds of pseudo random pattern pulse sequences in accordance with the one selected in the recording end in response to the aforesaid indicating signal which is extracted from the data signal input, that is, the reproduced output signal. Thus, the reproducing signal is applied through an input terminal 14 to an indicating signal detect-selector 19 which detects and selects the indicating signal out of the reproduced randomly coded signal which has almost the same configuration shown in FIG. 1. The detect-selector 19 controls the selecting switch $SW_5'$ in accordance with the received indicating signal. The above selected pseudo random pattern pulse sequence is modulo-2-added in the inversed polarity with the above reproduced randomly coded signal in a modulo-2 adder 20, so as to restore the original digital code signal faithfully, which is taken out from an output terminal 21.

Figure 3:
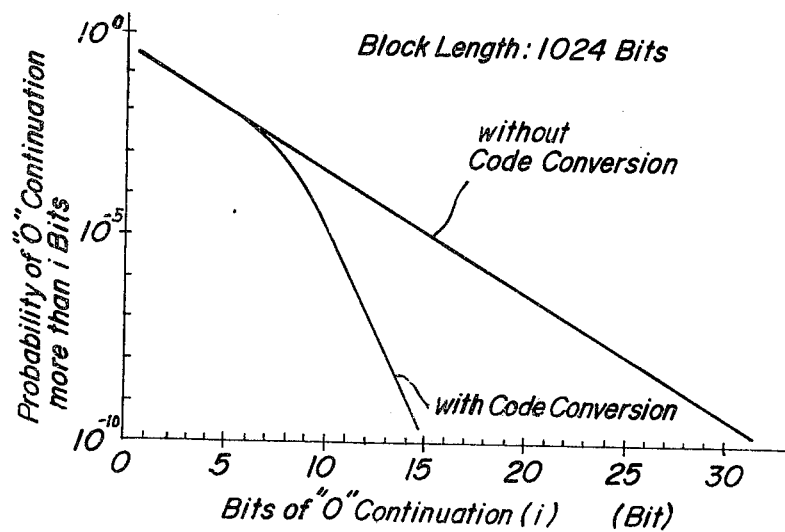

FIG. 3 shows an example of the effect of minimizing the continuation of "0" level bits in a randomly coded signal to be recorded which is converted from the input digital code signal in case that the aforesaid one division thereof has a length of 1,024 bits. In the graphs of FIG. 3, the relation between the number of continued "0" bits and the probability of occurrence of the continuation of "0" bits is shown in both the case where an input randomly coded signal is not converted at all and the case where the input randomly coded signal is converted according to the present invention as explained above.

As is evident from the graphs, the number of continued "0" level bits corresponding to the probability of $10^{-7}$ for the occurrence of continuation of "0" level bits is 22.3 bits in the former case, and in contrast therewith, the above number is markedly reduced to 12.2 bits in the latter case. Moreover, in a situation where the coded signal to be recorded does not have a random pattern, but rather a systematic pattern which is true of a digitized picture signal, that is, in the situation where the probability of an occurrence of a continuation of the "0" level bits in the input digital code signal is very large originally, the aforesaid effect obtained according to the present invention is even more remarkable.

The above mentioned randomly coded signal to be recorded, which is code converted by adding a pseudo random pattern pulse sequence thereto as explained earlier, is randomized to an extreme extent. Accordingly, even if the input digital code signal contains an extremely low frequency component, which is caused by the extremely long continuation of "0" level bits, the extremely low frequency component is removed from the above randomly coded signal to be recorded. So that, even if the recording and reproducing apparatus has a low frequency range cutoff response, the injurious effect thereof does not appear in the reproduced randomly coded signal, and the faithful reproduction of the original digital code signal can be realized as in the most preferable code conversion performed by the ordinary scrambled NRZI system.

However, in case one block of the input digital code signal is too short, the above effect obtained according to the present invention is reduced, and contrarily in case the above one block is too long, the effect obtained by the code conversion itself is reduced also. Consequently it is preferable in practice to settle the length of the above one block in a range from 100 bits to 10,000 bits. Furthermore, the kind of the pseudo random pattern pulse sequence to be added to the input digital code signal is not restricted to the aforesaid maximum shiftregister sequence, and any other kind of pseudo random pattern pulse sequence can be used to produce more than the four kinds of code conversions according to the present invention.

As is evident from the above explanation, in the digital magnetic recording and reproducing apparatus shown in FIGS. 2(a) and (b), wherein the NRZI system is improved according to the present invention, the occurrence of erroneous codes caused by the low frequency range cutoff response of the reproducing end can be reduced remarkably, and the regeneration of the clock pulse sequence in the reproducing end can be performed extremely stably. Also, the response of the automatic gain control and the automatic threshold level control, which are effected for suppressing the variation of level of the reproduced signal becomes quicker, so as to enable the quick discrimination of the quick variation of the reproduced signal level.

The above mentioned remarkable effects abtained by the present invention can be extended to the NRZI system applied to any other digital transmission systems.

Particularly, in case the aforesaid NRZI system and the so-called partial response system, which will be explained later in detail, are applied in combination with each other to the digital magnetic recording and reproducing apparatus, the above mentioned effects according to the present invention can be obtained more remarkably with regard to the reproduced binary code signal which is converted from the tertiary code signal reproduced directly from the magnetic carrier.

The present invention will now be explained in conjunction with an improved digital magnetic recording and reproducing apparatus using the so-called partial response system, wherein, in consideration of the transmission performance of the apparatus, the reproduced signal, which has a waveform differing from that of the recorded original signal and a favorable signal to noise ratio, undergoes a level comparison performed for restoring the correct waveform of the coded signal, and then the above restored coded signal is converted into the other restored coded signal provided with the same waveform as that of the input binary code signal which has undergone previously the counter-conversion of waveform in either one of the recording end and the reproducing end, preferably in the recording end, since the counterconverted code signal is unaccompanied by any other difficulties.

In the conventional partial response system, as mentioned above, in consideration of the distortion of waveform and the partial diminution of frequency response of the signal to noise ratio which are caused by the deteriorated performance frequently appearing in the received signal, for instance, the differentiated waveform owing to the meager response in the low frequency range in comparison with that in the middle frequency range and the remarkably lowered response in the higher frequency range, the aforesaid level comparison for restoring the correct waveform is applied to the reproduced signal which has such a waveform as conformed to the deteriorated response. Accordingly, the level comparison can be performed in the same preferable state as in the case where an original signal having the above differentiated waveform by nature is received faithfully through an ideal transmission system with an excellent signal to noise ratio.

On the other hand, in the magnetic recording and reproducing apparatus, just the same distortion of waveform and just the same partial diminution of frequency response of the signal to noise ratio as mentioned above, which are caused by just the same deteriorated performance of the apparatus as mentioned above, appears frequently in the reproduced signal. Accordingly, application of the partial response system to a digital magnetic recording and reproducing apparatus has been investigated for its expected remarkable effect.

However, the simple application of the conventional ordinary partial response system to the digital magnetic recording and reproducing apparatus cannot produce the expected effect to a sufficient degree because of those problems which are peculiar to the magnetic recording and reproducing apparatus as described earlier.

Moreover, in the aforesaid level comparison which is indispensable for the correction of the waveform reproduced according to the partial response system, the generation of the threshold levels required for the above level comparison is disturbed by the above peculiar problems, so that the required quick correction of waveform for the reproduced signal cannot be performed simply by applying the ordinary peak detection to the above generation of the threshold levels, even though peak detection provides remarkable effects in an ordinary digital transmission system.

That is to say in detail, it is difficult to remove sufficiently the injurious effect on the above generated threshold levels by only applying the ordinary simple peak detection to the reproduced signal.

For example, in the teriary code signal reproduced according to the partial response system which is applied to the magnetic recording and reproducing of the binary code signal, when the same signal level, that is, "+1" or "−1", continues in a duration of at least two bits, a pseudo peak level which exceeds the above same level, that is, "+1" or "−1" appears in the middle of the above duration at an interval far longer than that of the appearance of the above same level, that is, "+1" or "−1" and far less frequently than the above same level, that is, "+1" appears, so that the discharge time constant of the peak detection must be set at a far larger value than the ordinary value. However, when the time constant is set at a large value, the aforesaid threshold levels cannot respond faithfully to the quick variation of the average level of the reproduced signal. On the other hand, when the above time constant is set at an excessively small value, the peak-detected level is varied in response to the pattern of the reproduced signal, so that, when "+1" or "−1" does not appear so frequently and so continuously, the peak-detected level is lowered, and when "+1" or "−1" is continued so frequently, the peak-detected level is raised. Consequently, it is difficult to stably obtain the appropriate threshold levels making it impossible to perform the correct level comparison by the ordinary peak detection.

The present invention improves the indispensible level comparison performed in the aforesaid NRZI system and resolves the difficulty concerning the appropriate threshold level obtained using ordinary peak detection.

The above mentioned insufficient effect of the partial response system applied to the digital magnetic recording and reproducing apparatus can be increased according to the present invention as follows.

Figure 4A:
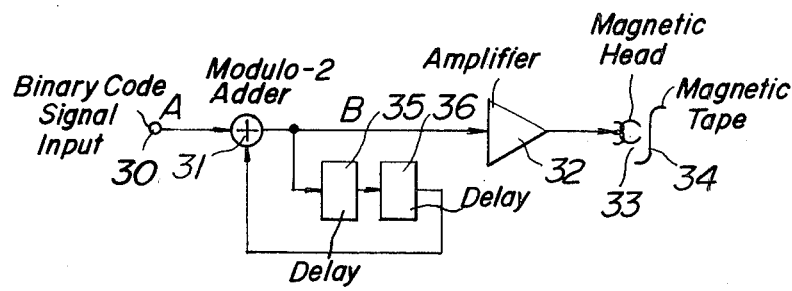
Figure 4B:
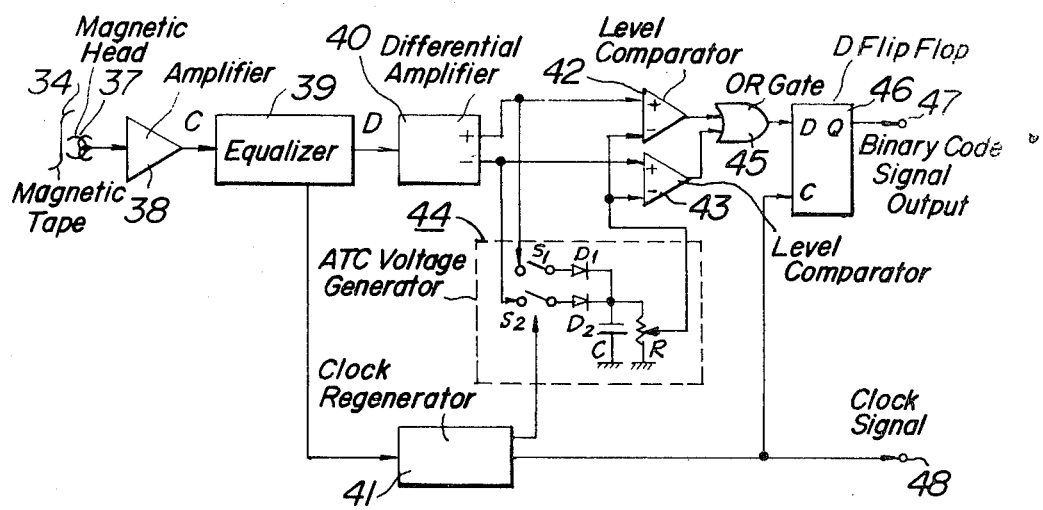

FIGS. 4(a) and 4(b) shows the recording end and the reproducing end of the partial response system which is applied to the digital magnetic recording and reproducing apparatus respectively, and FIG. 5 shows the waveforms of several signals appearing at various portions of those ends.

The outline of the fundamental behavior of the aforesaid apparatus, is as follows. An input binary coded signal A (FIG. 5) is converted to the waveform B for recording on a magnetic medium using the apparatus of FIG. 4(a). Waveform C represents the reproduced signal and corresponds to a differentiated version of recorded waveform B. The waveform C is converted to a tertiary code signal having the waveform D of FIG. 5 by means of adding analogously the reproduced signal proper and that obtained by delaying the reproduced signal by one bit. The converted tertiary code signal is converted again to a binary code signal having the desired restored waveform by means of translating "0" of the tertiary code signal to "0" of the reconverted binary code signal and further by translating "+1" and "−1" of the tertiary code signal to "1" of the reconverted binary code signal in common.

To permit restoration of the original binary code signal by the mentioned code conversions performed in the reproducing end, the required input binary code signal having the waveform A of FIG. 5 is first converted to another binary code signal having the same waveform B as that of the aforesaid recorded binary code signal, by means of modulo-2-adding the input binary code signal and the resultant signal which is obtained by the modulo-2-addition, but delayed by two bits. In the above modulo-2-addition, when "0" and "1" appear at the same time in respective ones of the two signals to be added, the signal level of the resultant signal, which should be recorded on the magnetic carrier, is set at a "1", and when "0" or "1" appear coincidently in both of the two signals to be added, the signal level of the resultant signal is set at a "0".

Consequently, by virtue of the aforesaid preconversion at the recording end and the aforesaid double code conversion at the reproducing end, the above-mentioned level comparison performed for correctly restoring the required original waveform of the input coded signal can be effected in a preferable state, that is, with a preferable signal to noise ratio and without the occurrence of erroneous codes.

Specifically referring to the drawings, in the recording end shown in FIG. 4(a) of the digital magnetic recording and reproducing apparatus which is improved according to the present invention, the required input binary code signal A is applied through an input terminal 30 to an modulo-2 adder 31, and a converted output binary code signal derived from the modulo-2 adder 31 is applied in series to two delays 35 and 36, which have a respective one bit delay time. The two bit delayed converted output binary code signal derived from the delays 35 and 36 is fed back to the above modulo-2 adder 31, where it is modulo-2-added to the input binary code signal. The converted output binary code signal B obtained by the aforesaid modulo-2-addition is applied through a recording amplifier 32 to a recording magnetic head 33 and then is recorded on a magnetic tape 34 thereby.

As an aside, where signal treatment at the reproducing end, which contains the above described code conversion tertiary and the code reconversion from the tertiary code signal into the binary code signal is termed the regular code conversion in the so-called partial response system, the just described preconversion consisting of the modulo-2-addition illustrated in FIG. 4(a) can be termed the counter conversion thereof.

On the other hand, in the reproducing end shown in FIG. 4(b) of the digital magnetic recording and reproducing apparatus according to the present invention, the reproduced signal obtained from the magnetic tape 4 on which the aforesaid converted output binary code signal B has been recorded, has a differentiated waveform owing to the differentiating performed by the reproducing head winding and a further attenuated in the higher frequency range. That is, the reproduced signal C has a waveform in which a positive pulse is formed at the portion where the recording current changes from negative to positive, and a negative pulse is formed at the portion where the recording current changes from positive to negative in response to the recorded binary code signal B.

Figure 4C:
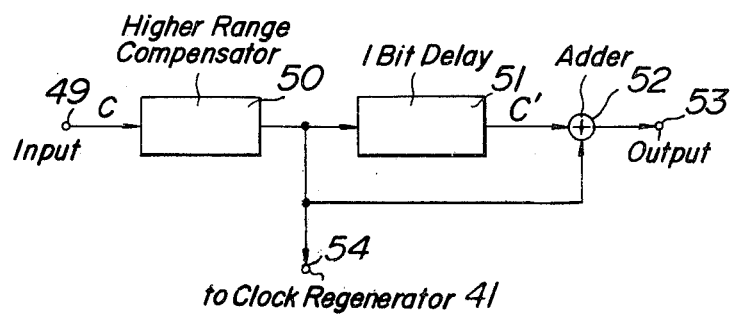

The reproduced signal C having the above mentioned waveform is applied to an equalizer 9 after being appropriately amplified by a reproducing amplifier 8. In the equalizer 9, which is constructed, for instance, as shown in FIG. 4(c), the frequency response in the higher range of the above reproduced signal C is compensated by a higher range compensator 50, thereafter, to ensure a smooth and correct level comparison for correcting the waveform of the reproduced signal C, which resembles a tertiary code signal, for reconstruction of the original waveform of the recorded binary code signal, the compensated reproduced signal C derived from the higher range compensator 9 and a signal C' derived from a one bit delay 51, which is connected in series to the compensator 50 so as to delay the compensated reproduced signal C by one bit, are added analogously with one another by an adder 52, so that the tertiary code signal having the waveform D can be obtained from an output terminal 53.

The above obtained tertiary code signal D is provided with signal levels corresponding almost to "+1", "0" or "−1" levels at every bit position, so that the required original waveform of the input binary code signal A, which is not yet undergone the aforesaid preconversion in the recording end, can be restored by means of converting the aforesaid tertiary code signal D to another binary code signal. In this reconversion a "0" is provided for each signal level corresponding to an approximate "0" of the D signal and a "1" is provided for each signal level corresponding to an approximate "+1" and "−1" level of the D signal.

The above mentioned code reconversion is performed by the combination of a differential amplifier 40, level comparators 42 and 43 and an OR gate 45 as shown in FIG. 4(b).

The reference signal having the threshold levels, which are required for the level comparison in the comparators 42 and 43 respectively, is applied by an automatic threshold controlling (ATC) voltage generator 44 which is fed by the differential amplifier 40.

In speaking in detail, the tertiary code signal D derived from the equalizer 39 is applied to the differential amplifier 40, and then, in the differential amplifier 40, positive and negative output signals which correspond respectively to "+1" and "−1" of the tertiary code signal D, can be obtained, by means of forming the difference between "0" level and other levels appearing at every correct bit position of the tertiary code signal D. The aforesaid negative output signal is derived from the differential amplifier 40 as a signal having positive voltage levels by changing the polarity thereof.

In order to code those positive and negative output signals by the level comparison, those positive and negative output signals are applied to the comparators 42 and 43 respectively, wherein the signal levels of those output signals are compared with the respective threshold levels which are almost equal to, for instance, one half of the respective signal levels to be provided in those output signals respectively.

As the result of the above mentioned level comparison, whenever it can be discriminated clearly that those positive and negative output signals are provided with "+1" and "−1" respectively, the comparison output signal of "1" respectively, the comparison output signal of "1" is obtained. The comparison output signal derived from the comparators 42 and 43 is applied to the OR gate 45, wherein whenever the tertiary code signal D are provided with those signal levels of "+1" or "−1" at respective bit positions, the gated output signal of "1", which provides the same waveform as the original binary code signal A, can be obtained. This gated output signal is derived from the output terminal 47 as the restored binary code signal, after its waveform is corrected by the D-type flip flop 46.

The various signal treatments of the reproduced signal described are performed under the control of the regenerated clock pulse sequence, which is regenerated by the clock generator 41 applied with the timing information which is extracted from the reproduced signal C in the equalizer 39, and further which is derived from the other output terminal 48 for decoding the aforesaid restored binary code signal.

The aforesaid threshold levels used for the level comparison in the comparators 42 and 43 are formed by the automatic threshold controlling (ATC) voltage generator 44, which is indicated in FIG. 4(b) by a surrounding dotted line. In the ATC voltage generator 44, the positive and negative output signals, which are derived from the differential amplifier 40 as positive voltage signals commonly, are applied commonly to the capacitor C through switches $S_1$, $S_2$ and diodes $D_1$, $D_2$ respectively, so that these output signals charge the capacitor C only in each time duration wherein switches $S_1$, $S_2$ are closed at the correct bit positions only with response to the regenerated clock pulse sequence, that is, in every time duration corresponding correctly to pulse widths of the clock pulse sequence. Where the above time duration for charging the capacitor C has a short period corresponding to the pulse width of the regenerated clock pulse sequence which is matched to the bit positions, it is possible to rectify the respective peak values of the signal levels of the converted output tertiary code signal D which is derived as a positive voltage signal. The aforesaid switches $S_1$, $S_2$ can be formed, for instance, of conventional diode bridge circuits.

By virtue of the above switching action of the switches $S_1$ and $S_2$, which is performed at the correct bit positions only, the correct signal level of the reproduced signal can be detected and used for generating the correct threshold level to be applied to the level comparators 42 and 43.

The probability of the appearance of "+1" or "−1" of the tertiary code signal is nearly equal to one half, and accordingly is sufficiently larger than that of the peak level which is higher than the level of "+1", for instance, the level at the point a of the converted output tertiary code signal D. So that, even if the aforesaid variation of the amplitude of the reproduced signal is caused, it is possible to obtain the voltage level stably which follows quickly and faithfully the variation of the desired level of "+1" or "−1", and it is possible to set the discharge time constant CR which is determined by the charging capacitor C and the potentiometer R connected in parallel at a small value which corresponds to the interval of the regenerated clock pulse sequence. So that, the above mentioned threshold levels, which have favorable values for the aforesaid level comparison due to the appropriately adjusted potentiometer R, can be fitted stably and quickly to the above mentioned variation of amplitude of the reproduced signal. It is preferable to settle the aforesaid discharge time constant CR at a value which is approximately ten times to one hundred times the interval of the clock pulse sequence, that is, of the bit interval, and an interval smaller than the time duration during which switches $S_1$, $S_2$ are closed, so as to reliably detect the peak level of respective pulses. Moreover, it is more preferable to apply any code conversion provided for reducing the probability of the continuation of "0" or "1" level to the reproduced signal to be peak-detected, so as to obtain a sufficiently smaller discharge time constant CR provided for varying the threshold levels in response to the variation of level of the reproduced signal.

The above mentioned formation of the threshold level required for the level comparison, which is applied to the partial response system utilized for the digital magnetic recording and reproducing apparatus, can be applied to the level comparison performed for correcting the reproduced or received multi-level coded signal to be transmitted through any kind of transmission system with a like remarkable effect.

As explained above, in the digital magnetic recording and reproducing apparatus shown in FIG. 4, which is applied with the partial response system is improved according to the present invention, so as to remove the injurious effects caused by the reduced response in the higher frequency range and the deteriorated signal to noise ratio in the lower frequency range owing to the differentiating performance of the winding of the reproducing magnetic head. Thus, it is possible to restore the coded signal with the preferably high signal to noise ratio and accordingly without any accompanying erroneous code caused by the injurious effect of the level variation of the reproduced signal, even if the recording of the coded signal is performed with an extremely high density.

Moreover, the aforesaid NRZI system, which is improved according to the present invention as explained earlier by referring to FIG. 2, can be applied additionally to the above mentioned apparatus shown in FIG. 4, so as to reduce the probability of the continuous occurrence of the same level in the reproduced signal, and accordingly to fit the threshold level used for the level comparison to accommodate quick variations of the reproduced signal level.

Next, the situation will be explained where the present invention is applied to improve the digital magnetic recording and reproducing apparatus wherein the peak detection is used for obtaining the threshold level required for correcting the reproduced coded signal by the level comparison, so as to restore the original coded signal to be recorded, especially, of the so-called NRZI system.

In the conventional digital magnetic recording and reproducing apparatus provided especially for recording and reproducing the NRZI signal, the waveform of the reproduced signal, which is differentiated according to the differentiating performance of the reproducing magnetic head is compensated by the integration, and then "1" and "0" level signals in the compensated waveform are discriminated by the level comparison, so as to restore the original NRZI signal.

Furthermore, the threshold level required for the above level comparison is obtained by deriving the average level of the reproduced NRZI signal from the dc restoring circuit, which is provided for reducing the injurious effect of noise components in the lower frequency range, which components are generated by the reproducing magnetic head and by the reproducing head amplifier and amplified by the above mentioned integrator.

The outline of operation of the above mentioned conventional apparatus will be explained by referring to the drawing of FIG. 6.

Figure 6:
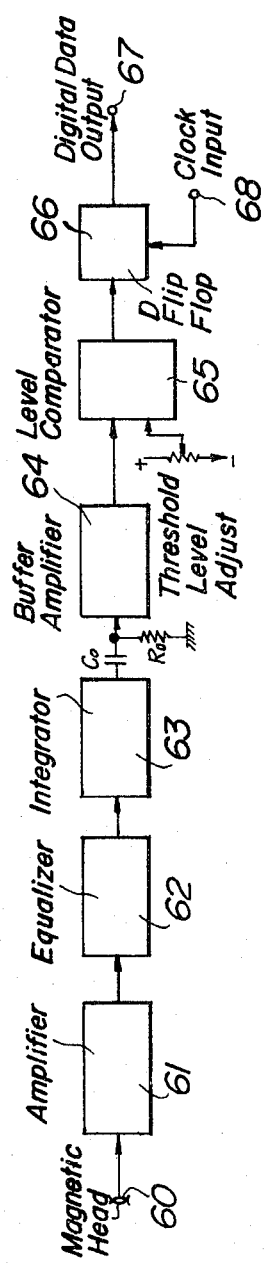
FIG. 6 is a block diagram showing a reproducing end of a conventional apparatus in which the ordinary dc restoration is performed.

In the reproducing end of the aforesaid conventional apparatus, which is shown in FIG. 6, the reproduced signal derived from the reproducing magnetic head 60 is amplified by the reproducing amplifier 61, and then the deteriorated response thereof in the higher frequency range, which is caused by the reproducing system, is compensated by the equalizer 62, and the differentiated waveform thereof caused by the aforesaid performance of the reproducing magnetic head 60 is compensated by the integrator 63, so that the NRZI signal which has almost the same waveform as that of the original recorded signal can be obtained.

In the above treatment of the reproduced signal, the thermal noise generated by the resistive component contained within the impedance of the reproducing magnetic head 60 and the low frequency component of the noise derived from the reproducing amplifier 61 are emphasized by the integrator 63. These noise components are extremely injurious to the reproduced signal. Accordingly, the low frequency component below the frequency $f_L (= \frac{1}{2}\pi C_0 R_0)$ of the reproduced signal is removed previously by the low frequency cutoff filter consisting of the capacitor $C_0$ and the resistor $R_0$ which are shown in FIG. 6, and then the reproduced signal derived therefrom is applied through the buffer amplifier 64 to the comparator 65. The reference voltage to be compared with the level of the reproduced signal in the level comparator 65 is formed as the voltage which is set invariably almost to the center of the level range of the output signal derived from the buffer amplifier 64. In the level comparator 65 which is applied with the reference level, "1" and "0" of the reproduced signal are discriminated, and then the output signal derived from the level comparator 65 is reformed by the D-type flip-flop 66 which is driven by the regenerated clock pulse sequence fed through the input terminal 68, and is derived from the output terminal 67 as the restored original NRZI signal.

However, the aforesaid low frequency cutoff filter consisting of the capacitor $C_0$ and the resistor $R_0$ removes the low frequency component of the required signal to be restored also as a matter of course, so that the mutual interference between the bits of the required coded signal is caused with the injurious effect on the aforesaid level comparison. Accordingly, it is necessary to set the aforesaid cutoff frequency $f_L$ below one half of a thousandth of the bit frequency of the coded signal in order to prevent the above injurious effect, so that it is impossible in consequence to remove the noise in the higher range beyond the above one half of a thousandth of the bit frequency.

As is apparent, the conventional digital magnetic recording and reproducing apparatus of the NRZI system has such a defect that the aforesaid remaining noise exerts the injurious effect upon the level comparison.

The above injurious effect exerted upon the level comparison can be removed according to the present invention as follows. If the threshold level used for the above level comparison is varied in response to slow variation in the average level of the reproduced coded signal to be compared, it is easy to remove the injurious effect caused by the low frequency noise which is contained in the reproduced coded signal.

The reproducing end of the digital magnetic recording and reproducing apparatus of the NRZI system which is improved according to the present invention will be explained by referring to the drawings of FIG. 7, which shows an example of the configuration of the improved reproducing end and of FIG. 8, which shows several waveforms appearing at various portions thereof.

The improved reproducing end shown in FIG. 7 is almost similar to the conventional one shown in FIG. 6, except for the following dc restoring circuit.

In the dc restoring circuit consisting in the reproducing end shown in FIG. 7, the positive peak levels C of the reproduced NRZI signal derived from the buffer amplifier 64 are detected by the combination of the capacitor $C_1$ and the resistor $R_1$, and the negative peak levels D thereof are detected by the combination of the capacitor $C_2$ and the resistor $R_2$.

The average level E of those positive and negative peak levels C and D can be derived from the middle point E of the series connection of the resistors $R_3$ and $R_4$. The above average level is used as the aforesaid threshold level provided for the level comparison, after being divided by the potentiometer $VR_1$ which is adjusted so as to obtain the most desirable threshold level for application to the level comparator 65 in good proportion with the reproduced coded signal to be compared.

According to the above configuration of the dc restoring circuit, even if the average level of the integrator output signal B varies slowly in comparison with that of the equalizer output signal A, owing to the superposition of the above mentioned low frequency noise thereon, as shown in FIG. 8, it is possible to perform the correct and faithful level comparison between the integrator output signal B and the detected average level E which is used as the aforesaid threshold level, so as to remove the injurious effect of the above low frequency noise.

FIG. 9 shows a preferable result obtained by the above dc restoration. In the graph of FIG. 9, the curve indicated by "without dc restoration" shows the relation between the noise margin and the noise frequency to bit frequency ratio in the case of the conventional apparatus. In the above conventional apparatus, the sinusoidal noise margin becomes sufficiently large only below the cutoff frequency $f_L$ of the low frequency cutoff filter consisting of the capacitor $C_0$ and the resistor $R_0$, which cutoff frequency is almost one half of a thousandth of the bit frequency in this case.

In contrast therewith, the curves illustrating the value of the discharge time constant $\tau_d$ of the aforesaid dc restoration in relation to the low frequency cutoff time constant $\tau_i$ of the above low frequency cutoff filter show the above relations in situations where the conventional apparatus is improved according to the present invention. In each case, the sinusoidal noise margin begins to increase at about one hundredth of the bit frequency.

In these cases, the optimum value of the discharge time constant $\tau_d$ of the aforesaid dc retoration can be selected as follows.

The curve indicated by $\tau_d = 0.1\tau_i$ shows the above relation where the discharge time constant $\tau_d$ is set at too small a value, causing the sinusoidal noise margin to be reduced in a higher frequency range, because, when "1" or "0" continues in a comparatively long time duration of the reproduced coded signal, it is difficult to detect the positive or negative peak level correctly. On the other hand, the curve indicated by $\tau_d = 10\tau_i$ shows the above relation where the discharge time constant $\tau_d$ is set at too large a value, causing only a slight improvement in the sinusoidal noise margin because the detected threshold level cannot be varied faithfully in response to the variation of the average level of the reproduced coded signal.

Consequently, the optimum result can be obtained when the discharge time constant $\tau_d$ is set at almost the same value as the low frequency cutoff time constant $\tau_i$.

FIG. 10 shows an example of the noise spectrum generated in the reproducing end of the digital magnetic recording and reproducing apparatus which is improved by providing the aforesaid dc restoring circuit according to the present invention.

As shown by the solid curve of the graph of FIG. 10, the noise spectrum applied to the level comparator 65 is increased into an extremely high level in the noise frequency range when the noise frequency is lower than two hundredths of the bit frequency. In contrast therewith, in the case that the aforesaid dc restoration according to the present invention is performed, as shown by the dotted curve of the graph of FIG. 10, the practically equivalent noise spectrum is reduced in the above low frequency range, and moreover does not increase in the middle and high frequency ranges.

As is evident from the above, by means of applying the aforesaid dc restoration according to the present invention as shown in FIG. 7, the injurious effect caused by the low frequency noise, which is emphasized by the integrator provided for compensating the differentiating performance of the winding of the reproducing magnetic head in the digital magnetic recording and reproducing apparatus, can be removed from the level comparison which is effected for restoring the original NRZI signal.

However, in the situation where a "0" or "1" continues for a comparatively long time duration of the original NRZI signal, the above mentioned remarkable effect is reduced by a considerable extent. Accordingly, it is desirable to apply the improved NRZI system described above in connection with FIG. 2 to the FIG. 6 apparatus together with the above mentioned dc restoration in order to reduce the probability of the continuation of "1" or "0".

By the way, the aforesaid dc restoration according to the present invention can be applied to other kinds of digital transmission systems wherein the lower frequency response is lowered to a fairly large extent.

Finally, the present invention features an improvement in the regular code conversion, the improvement being effected by means of modulo-2-adding a digital signal provided for preventing the continuation of same signal levels, the injurious effect of which is increased by the deformation of waveform and the variation of signal level and frequency response, which are caused mainly by the differentiating performance of magnetic heads, from a reproduced digital code signal in a digital magnetic recording and reproducing apparatus and the counter conversion effected for restoring the above regular conversion, and further featured by improving the level comparison provided for correcting the waveform of the reproduced digital code signal by means of utilizing a threshold level detected by applying the reproduced digital code signal to a compensator and peak rectifiers which treat the reproduced digital code signal with the same time constant, in order to reproduce correctly the original digital code signal.

The former of the above mentioned two kinds of improvements is represented by the improved NRZI system as shown in FIG. 2 and by the improved partial response system as shown in FIG. 4, and the latter of the above mentioned two Kinds of improvements is represented by the improved dc restoration as shown in FIG. 7.

Figure 11B:
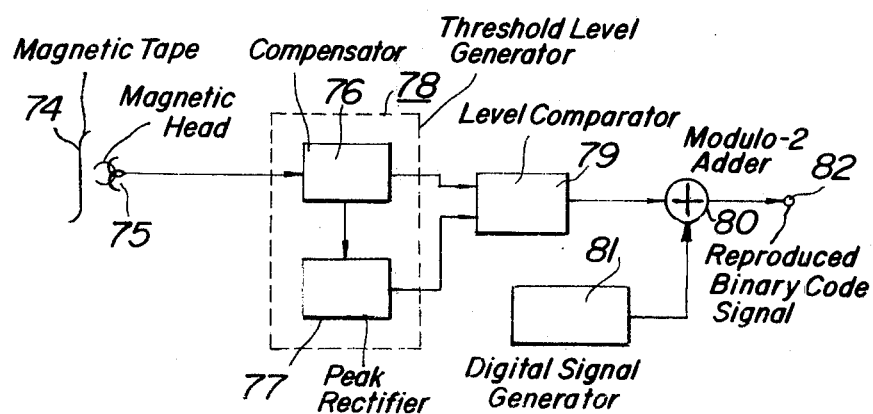

Consequently, the typical configuration of the recording end of the digital magnetic recording and reproducing apparatus according to the present invention can be represented as shown in FIG. 11(a) and the typical configuration of the reproducing end thereof can be represented as shown in FIG. 11(b).

In the recording end shown in FIG. 11(a), a binary code signal to be recorded is applied from an input terminal 70 to a modulo-2 adder 71, and further another binary code signal which is derived from a digital signal generator 72 is applied also to the modulo-2 adder 71. In the modulo-2 adder 71, the above two kinds of binary code signals are added in modulo-2 with each other, and a resultant signal of the modulo-2-addition is recorded on a magnetic tape 74 by a recording magnetic head 73.

In the reproducing end shown in FIG. 11(b), the above resultant signal reproduced from the magnetic tape 74 by a reproducing magnetic head 75 is applied through a compensator 76 to a level comparator 79. A threshold level derived from a threshold level generator 78 which consists of the compensator 76 and a peak rectifier 77, both provided with the same time-constant, is also applied to the level comparator 79. In the level comparator 79, the above resultant signal and the threshold level are compared with each other.

Another resultant signal derived from the level comparator 79 is applied to another modulo-2 adder 80, and further still another binary code signal derived from another digital signal generator 81, which generates still another binary code signal, is also applied to the modulo-2 adder 80.

In the modulo-2 adder 80, the resultant signal derived from the level comparator 79 and the still other binary code signal are added in modulo-2 with each other and a still another resultant signal of the modulo-2 addition is taken out from an output terminal 82 as the reproduced original binary code signal.

The above mentioned typical configuration shown in FIG. 11 can be modified as shown in FIGS. 12(a) and (b) by referring to the improved NRZI system shown in FIG. 2.

In the recording end shown in FIG. 12(a), the binary code signal to be recorded is applied from the input terminal 70 to a randomizer 84, which consists of a one-block delay 2 and a modulo-2 adder 12, and to a "0" continuation discriminating circuit 5 also. The other binary code signal consisting of a pseudo-random code signal, which is derived from a pseudo-random code generator 83 and selected in the "0" continuation discriminating circuit 5 by referring to the input binary code signal, is applied also to the modulo-2 adder 12, and the resultant signal of the modulo-2 addition is recorded on the magnetic tape 74 by the recording magnetic head 73.

Figure 12B:
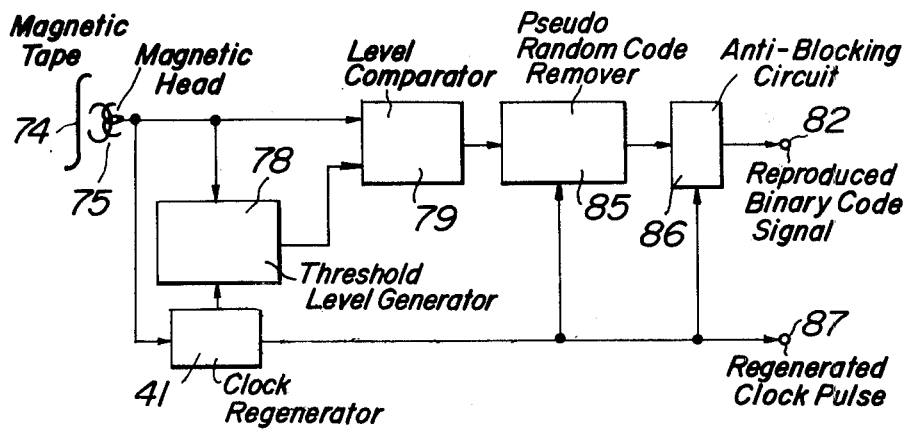

In the reproducing end shown in FIG. 12(b), the above resultant signal reproduced from the magnetic tape 74 by the reproducing magnetic head 75 is applied to the level comparator 79, a threshold level generator 78 and a clock regenerator 41. The threshold level, which is generated in the threshold level generator 78 under the control of a regenerated clock signal derived from the clock regenerator 41, is applied to the level comparator 79, and the other resultant signal derived from the level comparator 79 is applied to a pseudo-random code remover 85, so as to remove the pseudo-random code signal, which was added previously in the recording end, by means of modulo-2 adding the same pseudo-random code signal in the reverse polarity, under the control of the regenerated clock signal.

The still other resultant signal derived from the pseudo-random code remover 85 is taken out through an anti-blocking circuit 86 from the output terminal 82 as the reproduced original binary code signal, and the regenerated clock signal is taken out also from the other output terminal 87.

As mentioned earlier, the digital magnetic recording and reproducing apparatus according to the present invention can be improved furthermore by combining two kinds of the aforesaid preferred embodiments of the present invention. Two examples of such a combination of the preferred embodiments are shown in FIGS. 13(a) and (b) and in FIGS. 14(a) and (b) respectively, the former of which shows the combination of the embodiments represented by FIGS. 2 and 4, and the latter of which shows the combination of the embodiments represented by FIGS. 2 and 7.

What is claimed is:

1. A digital magnetic recording and reproducing apparatus, wherein a digital code signal is recorded and reproduced magnetically, comprising:
   a first signal generating means for generating a first digital signal provided for preventing the continuation of the same signal levels in said digital code signal;
   a first adder for effecting a code conversion by modulo-2-adding together said digital code signal and said first digital signal;
   a recording means for recording an output signal derived from said first adder on a magnetic carrier;
   a reproducing means for reproducing said output signal from said magnetic carrier;
   a threshold level generating means for generating a threshold level comprising a compensator and at least two peak rectifiers which treat an applied input signal derived from said reproduced signal with the same time-constant respectively;
   a level comparator for correcting the waveform of said applied input signal by comparing said applied input signal with said threshold level derived from said threshold level generator;
   a second signal generating means for generating a second digital signal provided for restoring said code conversion; and,
   a second adder for modulo-2-adding together a corrected output signal derived from said level comparator and said second digital signal, so as to restore said digital code signal.

2. A digital magnetic recording and reproducing apparatus as claimed in claim 1, wherein said digital code signal is divided by at least one predetermined interval and said first signal generating means comprises:
   a first pulse sequence generator for generating a first pseudo random pattern pulse sequence which has a predetermined pulse pattern;
   a first pseudo code signal generator for generating a first group of pseudo code signals consisting of said first pseudo random pattern pulse sequence derived from said first pulse sequence generator and at least one converted random pattern pulse sequence derived respectively from said first pseudo random pattern, said first pseudo code signal generator comprising a delaying means for delaying said pseudo random pattern pulse sequence and an inverting means for inverting said pseudo random pattern pulse sequence;
   at least one exclusively adding logic circuit for generating at least one converted code pulse sequence by adding respectively said first group of pseudo code signals derived from said first pseudo code signal generator and said digital code signal;
   a continuation discriminating circuit for discriminating the number of continuous "1" and "0" levels contained in said converted code pulse sequences and for detecting one converted code pulse sequence which has the least number of continuous "1" and "0" levels; and,
   a first switching means for selecting one of said first group of pseudo code signals which corresponds to the converted code pulse sequence detected by said continuation discriminating circuit to generate said first digital signal; and wherein,
   said first adder adds said selected one of said first group of pseudo code signals to a delayed said digital code signal, the latter being delayed by a delay circuit having a delay time corresponding to said predetermined interval, said adder also adding an indicating signal provided for indicating said one of said first group of pseudo code signals so as to form a converted output signal for recording, said converted output signal comprising an added output signal derived from said first adder and an indicating signal provided for indicating said one of said first group of pseudo code signals; and wherein,
   said second signal generating means comprises:
   a second pulse sequence generator for generating a second pseudo random pattern pulse sequence which has the same pulse pattern as the first pseudo random pattern pulse sequence generated by said first pulse sequence generator;
   a second pseudo code signal generator for generating a second group of pseudo code signals consisting of said second pseudo random pattern pulse sequence derived from said second pulse sequence generator and at least one converted random pattern pulse sequence derived respectively from said second pseudo random pattern pulse sequence, said second pseudo code signal generator comprising a delay means for delaying said second pseudo random pattern pulse sequence derived from said second pulse sequence generator and an inverting means for inverting said second pseudo random pattern pulse sequence derived from said second pulse sequence generator;
   a second switching means for selecting one of said second group of pseudo code signals which corresponds to said indicating signal contained in said output signal reproduced from said magnetic carrier by said reproducing means, so as to generate said second digital signal.

3. A digital magnetic recording and reproducing apparatus as claimed in claim 2, wherein said digital code signal divided by at least one said predetermined interval consists respectively of
   a synchronizing signal having a predetermined pattern which indicates a timing of said predetermined interval respectively,
   said indicating signal indicating said one converted code pulse sequence, and
   a data signal contained in said digital code signal.

4. A digital magnetic recording and reproducing apparatus as claimed in claim 3, wherein the last bit of said synchronizing signal is always a "1".

5. A digital magnetic recording and reproducing apparatus as claimed in claim 1, wherein said first added adds said digital code signal which is formed as a binary code signal and said first digital signal which is generated by delaying said added output signal derived from said first adder by two bits in said first signal generating means; and
   said second adder adds said reproduced output signal derived from said reproducing means and said second digital signal which is generated by delaying said reproduced output signal by one bit in said second signal generating means, so as to generate an added output signal which is formed as a tertiary code signal; and
   said threshold level generating means generates a threshold level which commonly corresponds to positive and negative peaks of said tertiary code signal; and, said level comparator compares said tertiary signal and an inverse of said tertiary code signal with said threshold level respectively, so as to reproduce said digital code signal by forming another binary code signal which has "1" corresponding to each "+1" and "−1" level derived from said level comparator as a result of level comparison.

6. A digital magnetic recording and reproducing apparatus as claimed in claim 5, wherein said at least two peak rectifiers of said threshold level generating means are applied with said positive peak and an inverse of said negative peak of said tertiary code signal respectively through switching means which are closed for short time durations including the bit positions of said tertiary code signal respectively.

7. A digital magnetic recording and reproducing apparatus as claimed in claim 5, wherein said threshold level generating means has a time-constant which is from 10 to 100 times the period of a clock.

8. A digital magnetic recording and reproducing apparatus as claimed in claim 1, wherein said at least two peak rectifiers detect both positive and negative quasipeaks of said added output signal when said digital code signal is formed as one of a non-return-to-zero code signal and a non-return-to-zero-inverse code signal.

9. A digital magnetic recording and reproducing apparatus as claimed in claim 2, further comprising:

a third adder for code converting the output signal from said first adder by adding together the output signal from said first adder and a third digital signal, said third digital signal being generated by a third signal generating means which delays the output signal from said third adder by two bits, said recording means recording the output signal of said third adder; and, a fourth adder for adding together a reproduced output signal derived from said reproducing means and a fourth digital signal, said fourth digital signal being generated by a fourth signal generator which delays said reproduced output signal by one bit, the output of said fourth adder being applied to said threshold level generating means and level comparator as said applied input signal.

* * * * *